(12) United States Patent
Shirai (10) Patent No.: US 11,180,212 B2
(45) Date of Patent: Nov. 23, 2021

(54) FLUID FLOW CONTROL STRUCTURE FOR A TELESCOPIC APPARATUS OF A HUMAN POWERED VEHICLE

(71) Applicant: Shimano Inc., Osaka (JP)

(72) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 677 days.

(21) Appl. No.: 16/036,976

(22) Filed: Jul. 17, 2018

(65) Prior Publication Data

US 2020/0023918 A1 Jan. 23, 2020

(51) Int. Cl.
*B62J 1/08* (2006.01)
*F15B 15/16* (2006.01)

(52) U.S. Cl.
CPC .............. *B62J 1/08* (2013.01); *F15B 15/16* (2013.01); *B62J 2001/085* (2013.01)

(58) Field of Classification Search
CPC ......... B62J 1/08; B62J 2001/085; F15B 15/16
See application file for complete search history.

(56) References Cited

U.S. PATENT DOCUMENTS

| | | | | |
|---|---|---|---|---|
| 7,083,180 B2 * | 8/2006 | Turner | ................. | B62K 19/36 188/300 |
| 8,302,983 B1 * | 11/2012 | Hsu | .................. | B62J 1/08 280/281.1 |
| 8,550,551 B2 * | 10/2013 | Shirai | ................. | B62K 19/36 297/215.13 |
| 8,833,848 B2 | 9/2014 | Shirai | | |
| 9,511,809 B2 * | 12/2016 | Kodama | .................. | B62J 1/08 |
| 2009/0108642 A1 * | 4/2009 | Hsu | .................. | B62K 19/36 297/195.1 |
| 2009/0324327 A1 * | 12/2009 | McAndrews | ............. | B62J 1/08 403/409.1 |
| 2010/0308628 A1 * | 12/2010 | Hsu | .................. | B62J 1/08 297/215.14 |
| 2011/0057485 A1 * | 3/2011 | Shirai | ................. | B62J 1/08 297/199 |
| 2011/0204201 A1 * | 8/2011 | Kodama | .................. | B62J 1/08 248/406.1 |

(Continued)

FOREIGN PATENT DOCUMENTS

| | | |
|---|---|---|
| DE | 10 2017 000 470 A1 | 8/2017 |
| DE | 10 2017 111 854 A1 | 12/2018 |

*Primary Examiner* — Minnah L Seoh
*Assistant Examiner* — Conan D Duda
(74) *Attorney, Agent, or Firm* — Global IP Counselors, LLP (57) ABSTRACT

A fluid flow control structure is provided for a telescopic apparatus of a human powered vehicle. The fluid flow control structure basically comprises a first tube, a second tube and a positioning structure. The second tube is telescopically coupled to the first tube to move in an axial direction. The positioning structure includes first, second and third fluid chambers, and a valve that defines a port that is selectively opened and closed. The valve includes a valve body that is movable relative to a valve seat in the axial direction to change a valve state between a closed state and an open state. The valve body fluidly separates the first and second fluid chambers in the closed state and to fluidly connect the first and second fluid chambers in the open state. The third fluid chamber includes a compressible fluid.

16 Claims, 8 Drawing Sheets

(56) References Cited

U.S. PATENT DOCUMENTS

| | | | |
|---|---|---|---|
| 2011/0257848 A1* | 10/2011 | Shirai | B62K 19/36 701/49 |
| 2012/0098175 A1* | 4/2012 | Wu | B62K 19/36 267/132 |
| 2012/0104727 A1* | 5/2012 | Hsu | B62J 1/08 280/287 |
| 2012/0104809 A1* | 5/2012 | Hsu | B62J 1/08 297/215.13 |
| 2012/0228906 A1* | 9/2012 | McAndrews | F16B 7/1409 297/215.13 |
| 2012/0247894 A1* | 10/2012 | Shirai | B62K 19/36 188/322.13 |
| 2013/0093231 A1* | 4/2013 | Hsu | B62J 1/06 297/344.19 |
| 2013/0119634 A1* | 5/2013 | Camp | B62J 1/08 280/287 |
| 2013/0221713 A1* | 8/2013 | Pelot | G05B 15/02 297/215.13 |
| 2014/0174286 A1* | 6/2014 | Pittens | F15B 1/26 91/5 |
| 2014/0208933 A1* | 7/2014 | Kuo | F16F 9/3221 91/43 |
| 2015/0034779 A1* | 2/2015 | McAndrews | B62J 1/08 248/125.8 |
| 2015/0191208 A1* | 7/2015 | Hsu | B62K 19/36 403/322.3 |
| 2015/0225030 A1* | 8/2015 | Shirai | B62K 19/36 403/27 |
| 2015/0232142 A1* | 8/2015 | Shirai | B62K 19/36 403/104 |
| 2015/0239517 A1* | 8/2015 | Shirai | B62J 1/08 403/104 |
| 2015/0300382 A1* | 10/2015 | Kuo | B62J 1/06 91/45 |
| 2016/0121952 A1* | 5/2016 | Shirai | B62J 1/08 248/161 |
| 2016/0176463 A1* | 6/2016 | McPherson | B62J 1/04 297/215.15 |
| 2016/0304146 A1* | 10/2016 | Teixeira | B62J 1/06 |
| 2016/0355225 A1* | 12/2016 | Shirai | B62J 1/08 |
| 2017/0043832 A1* | 2/2017 | Tsai | B62K 19/36 |
| 2017/0106927 A1* | 4/2017 | McAndrews | B62J 1/06 |
| 2017/0106928 A1* | 4/2017 | Madau | F16F 9/52 |
| 2017/0240233 A1* | 8/2017 | Tsai | B62J 1/08 |
| 2017/0274949 A1* | 9/2017 | Pittens | B62J 1/08 |
| 2017/0282986 A1* | 10/2017 | Jhou | B62J 1/08 |
| 2017/0341692 A1 | 11/2017 | Shirai | |
| 2018/0001953 A1* | 1/2018 | Winefordner | B62J 1/08 |
| 2018/0057087 A1* | 3/2018 | Jhou | F15B 15/202 |
| 2018/0127041 A1* | 5/2018 | Tsai | B62K 19/36 |
| 2018/0186419 A1* | 7/2018 | Shipman | B62K 19/36 |
| 2018/0194418 A1* | 7/2018 | Bowers | F16B 7/1409 |
| 2018/0334212 A1* | 11/2018 | Bowers | B62K 3/02 |
| 2019/0002050 A1* | 1/2019 | Shipman | B62J 1/06 |
| 2019/0002051 A1* | 1/2019 | Shipman | B62K 19/36 |
| 2019/0039669 A1* | 2/2019 | McAndrews | B62K 19/18 |

\* cited by examiner

FLUID FLOW CONTROL STRUCTURE FOR A TELESCOPIC APPARATUS OF A HUMAN POWERED VEHICLE

BACKGROUND

Field of the Invention

This invention generally relates to a fluid flow control structure. More specifically, the present invention relates to a fluid flow control structure for a telescopic apparatus of a human powered vehicle such as a bicycle.

Background Information

Some human-powered vehicles, in particular bicycles, have been provided with a telescopic apparatus such as a seatpost. The seatpost adjustably supports a bicycle seat on a bicycle frame. Typically, the seatpost is telescopically disposed in a seat tube of the bicycle frame. The height of the bicycle seat with respect to the bicycle frame is typically adjusted by changing an insertion amount of the seatpost in the seat tube of the bicycle frame. The upper end of the seat tube is typically provided with a longitudinal slit and a clamping that adjusts the diameter of the upper end of the seat tube to squeeze the seatpost for securing the seatpost in a desired position with respect to the bicycle frame.

SUMMARY

Generally, the present disclosure is directed to various features of a fluid flow control structure for a telescopic apparatus of a human-powered vehicle. Human-powered vehicle vehicles as used here in refers to vehicles regardless of the number of their wheels, that are power by a human and not by a motor or engine.

In one feature, a fluid flow control structure is provided for a telescopic apparatus of a human-powered vehicle in which the fluid flow control structure can reduce an operating force for operating fluid flow control structure to change a dimension (e.g., a height) of the telescopic apparatus.

In view of the state of the known technology and in accordance with a first aspect of the present disclosure, a fluid flow control structure is provided for a telescopic apparatus of a human powered vehicle. The fluid flow control structure basically comprises a first tube, a second tube and a positioning structure. The first tube has a center axis. The second tube is telescopically coupled to the first tube to move in an axial direction of the center axis. The positioning structure includes a first fluid chamber, a second fluid chamber, a third fluid chamber, and a valve. The valve defines a port that is selectively opened and closed. The valve includes a valve body and a valve seat. The valve body is movable relative to the valve seat in the axial direction to change a valve state between a closed state and an open state. The valve body is configured to fluidly separate the first fluid chamber from the second fluid chamber in the closed state and to fluidly connect the first fluid chamber to the second fluid chamber in the open state. The third fluid chamber includes a compressible fluid. With the fluid flow control structure according to the first aspect, it is possible to reduce an operating force for operating fluid flow control structure to change a height of the telescopic apparatus.

In accordance with a second aspect of the present invention, the fluid flow control structure according to the first aspect is configured so that the third fluid chamber is configured such that the compressible fluid biases the valve body toward the valve seat in the open state. With the fluid flow control structure according to the second aspect, it is possible to improve the closing performance the valve body.

In accordance with a third aspect of the present invention, the fluid flow control structure according to the first or second aspect is configured so that the first fluid chamber and the valve body defines a first pressure-receiving dimension while the valve is in the closed state, and the third fluid chamber and the valve body defines a second pressure-receiving dimension while the valve is in the closed state. The second pressure-receiving dimension is smaller than the first pressure-receiving dimension. With the fluid flow control structure according to the third aspect, it is possible to reduce an operating force for operating fluid flow control structure to change a height of the telescopic apparatus.

In accordance with a fourth aspect of the present invention, the fluid flow control structure according to any one of the first to third aspects is configured so that the first and second fluid chambers include an incompressible fluid. With the fluid flow control structure according to the fourth aspect, it is possible to maintain a selected dimension (e.g., a height) of the telescopic apparatus.

In accordance with a fifth aspect of the present invention, the fluid flow control structure according to any one of the first to fourth aspects is configured so that the third fluid chamber is configured to increase in volume as the valve body is moved toward the valve seat, and is configured to decrease in volume as the valve body is moved away from the valve seat. With the fluid flow control structure according to the fifth aspect, it is possible to improve the closing and sealing performance the valve body with respect to the valve seat.

In accordance with a sixth aspect of the present invention, the fluid flow control structure according to any one of the first to fifth aspects is configured so that the third fluid chamber is defined between a dividing member and the valve. With the fluid flow control structure according to the sixth aspect, it is possible to easily define the third fluid chamber and set the pressure of the third fluid chamber to a desired pressure.

In accordance with a seventh aspect of the present invention, the fluid flow control structure according to the sixth aspect is configured so that the dividing member is configured to receive an end portion of the valve body. With the fluid flow control structure according to the seventh aspect, it is possible for the fluid of the third fluid chamber to directly apply a force on the valve body.

In accordance with an eighth aspect of the present invention, the fluid flow control structure according to any one of the first to seventh aspects is configured so that the second tube has a distal end disposed closer to a bicycle seat mounting end and a proximal end opposite to the distal end in the axial direction, and the third fluid chamber is configured to be disposed closer to the distal end of the second tube than the first fluid chamber. With the fluid flow control structure according to the eighth aspect, it is possible to use the fluid flow control structure to support a bicycle seat such that the height of the bicycle seat is adjustable.

In accordance with a ninth aspect of the present invention, the fluid flow control structure according to any one of the first to eighth aspects is configured so that the valve seat includes a first tapered surface that contacts the valve body in the closed state. With the fluid flow control structure according to the ninth aspect, it is possible to improve the sealing performance between the valve body and the valve seat in the closed state.

In accordance with a tenth aspect of the present invention, the fluid flow control structure according to the ninth aspect is configured so that the first tapered surface has a first axial end and a second axial end. The first tapered surface is configured such that a diameter of the first tapered surface decreases from the first axial end toward the second axial end. The first axial end is disposed closer to the third fluid chamber than is the second axial end. With the fluid flow control structure according to the tenth aspect, it is possible to improve the sealing performance between the valve body and the valve seat in the closed state.

In accordance with an eleventh aspect of the present invention, the fluid flow control structure according to the ninth or tenth aspect is configured so that the valve body includes a second tapered surface configured to contact the valve seat. With the fluid flow control structure according to the eleventh aspect, it is possible to improve the sealing performance between the valve body and the valve seat in the closed state.

In accordance with a twelfth aspect of the present invention, the fluid flow control structure according to the eleventh aspect is configured so that at least part of the second tapered surface includes a partial spherical surface. With the fluid flow control structure according to the twelfth aspect, it is possible to improve the sealing performance between the valve body and the valve seat in the closed state.

In accordance with a thirteenth aspect of the present invention, the fluid flow control structure according to any one of the first to twelfth aspects is configured so that the positioning structure further includes a fourth fluid chamber having a compressible fluid, and a movable piston disposed between the first and fourth fluid chambers to change a volume ratio between the first and fourth fluid chambers. The compressible fluid in the fourth fluid chamber biases the movable piston toward the first fluid chamber. With the fluid flow control structure according to the thirteenth aspect, it is possible to bias the first and second tubes apart from each other.

In accordance with a fourteenth aspect of the present invention, the fluid flow control structure according to the thirteenth aspect is configured so that the positioning structure further includes a check valve disposed in a fluid passage of the first fluid chamber to block incompressible fluid in the first fluid chamber from flowing away from the valve body towards the movable piston while the valve body is in the closed state. With the fluid flow control structure according to the fourteenth aspect, it is possible to appropriately control the pressure in the first fluid chamber while the valve body is in the closed state.

In accordance with a fifteenth aspect of the present invention, the fluid flow control structure according to any one of the first to fourteenth aspects is configured so that the valve body includes a first portion that contacts the valve seat, a second portion that extends from the first portion, and a third portion coupled to the second portion at an opposite end of the second portion from the first portion. The first fluid chamber and the first portion of the valve body defines a first pressure-receiving dimension while the valve body is in the closed state. The third fluid chamber and the first portion of the valve body defines a second pressure-receiving dimension while the valve body is in the closed state. The second pressure-receiving dimension is smaller than the first pressure-receiving dimension. The first fluid chamber and the third portion of the valve body defines a third pressure-receiving dimension while the valve body is in the closed state. The second and third pressure-receiving dimensions are equal. With the fluid flow control structure according to the fifteenth aspect, it is possible to reduce an operating force for operating fluid flow control structure to change a height of the telescopic apparatus.

In accordance with a sixteenth aspect of the present invention, the fluid flow control structure according to any one of the first to fifteenth aspects further comprises an actuator configured to move the valve body to change the valve state from one of the closed state and the open state to the other of the closed state and the open state. With the fluid flow control structure according to the sixteenth aspect, it is possible to easily operate the valve body.

In accordance with a seventeenth aspect of the present invention, a height adjustable seatpost assembly as the telescopic apparatus comprising the fluid flow control structure according to any one of the first to fifteenth aspects, and further comprises an actuator configured to move the valve body to change the valve state from one of the closed state and the open state to the other of the closed state and the open state. With the fluid flow control structure according to the seventeenth aspect, it is possible use the telescopic apparatus as a height adjustable seatpost assembly for adjusting a height of a seat.

Also, other objects, features, aspects and advantages of the disclosed fluid flow control structure will become apparent to those skilled in the art from the following detailed description, which, taken in conjunction with the annexed drawings, discloses a preferred embodiment of the fluid flow control structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
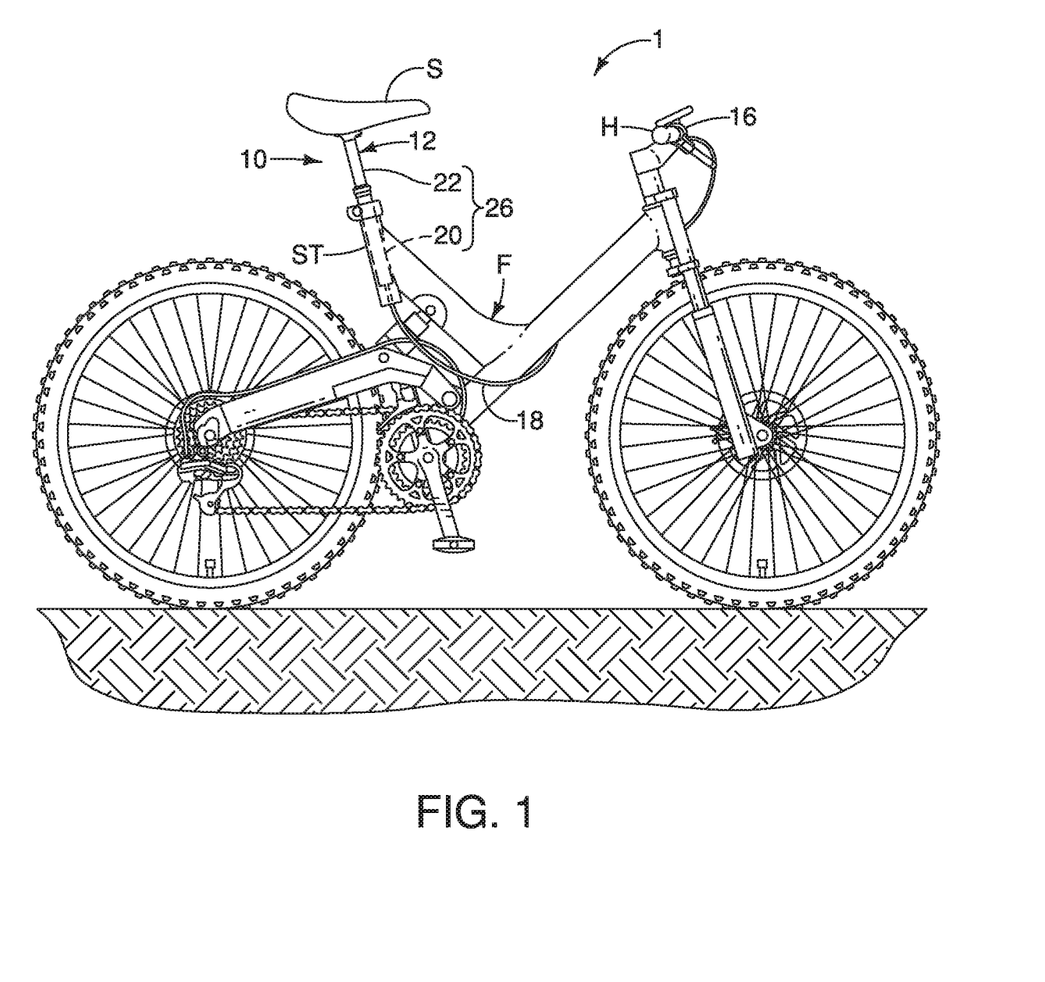
FIG. 1 is a side elevational view of a human-powered vehicle (e.g., a bicycle) equipped with a height adjustable seatpost assembly having a fluid flow control structure in accordance with one embodiment.

Referring initially to FIG. 1, a human powered vehicle 1 is illustrated that is equipped with a height adjustable seatpost assembly 10 in accordance with a first embodiment. The height adjustable seatpost assembly 10 is one example of a telescopic apparatus of the present invention. The telescopic apparatus of the present invention can be adapted to other components such as a suspension. In other words, a height adjustable seatpost assembly is a telescopic apparatus of the present invention. The height adjustable seatpost assembly 10 can also be called a bicycle seatpost assembly.

Here, in the illustrated embodiment, for example, the human powered vehicle 1 is a bicycle. The height adjustable seatpost assembly 10 is configured to selectively adjust a seat height of a bicycle seat S relative to a bicycle frame F. Here, in the illustrated embodiment, the height adjustable seatpost assembly 10 is mechanically actuated by a rider. Alternatively, the height adjustable seatpost assembly 10 can be modified to be automatically operated via an electronic controller.

In the illustrated embodiment, the height adjustable seatpost assembly 10 is a separate unit that is mounted in a seat tube ST of the bicycle frame F. In particular, the upper end of the seat tube ST is provided with a longitudinal slit such that a clamping device adjusts the diameter of the upper end of the seat tube ST to squeeze the upper end of the seat tube ST around the height adjustable seatpost assembly 10. When the height adjustable seatpost assembly 10 is mounted to the seat tube ST, the height adjustable seatpost assembly 10 adjusts a seat height of the bicycle seat S with respect to the seat tube ST.

Figure 2:
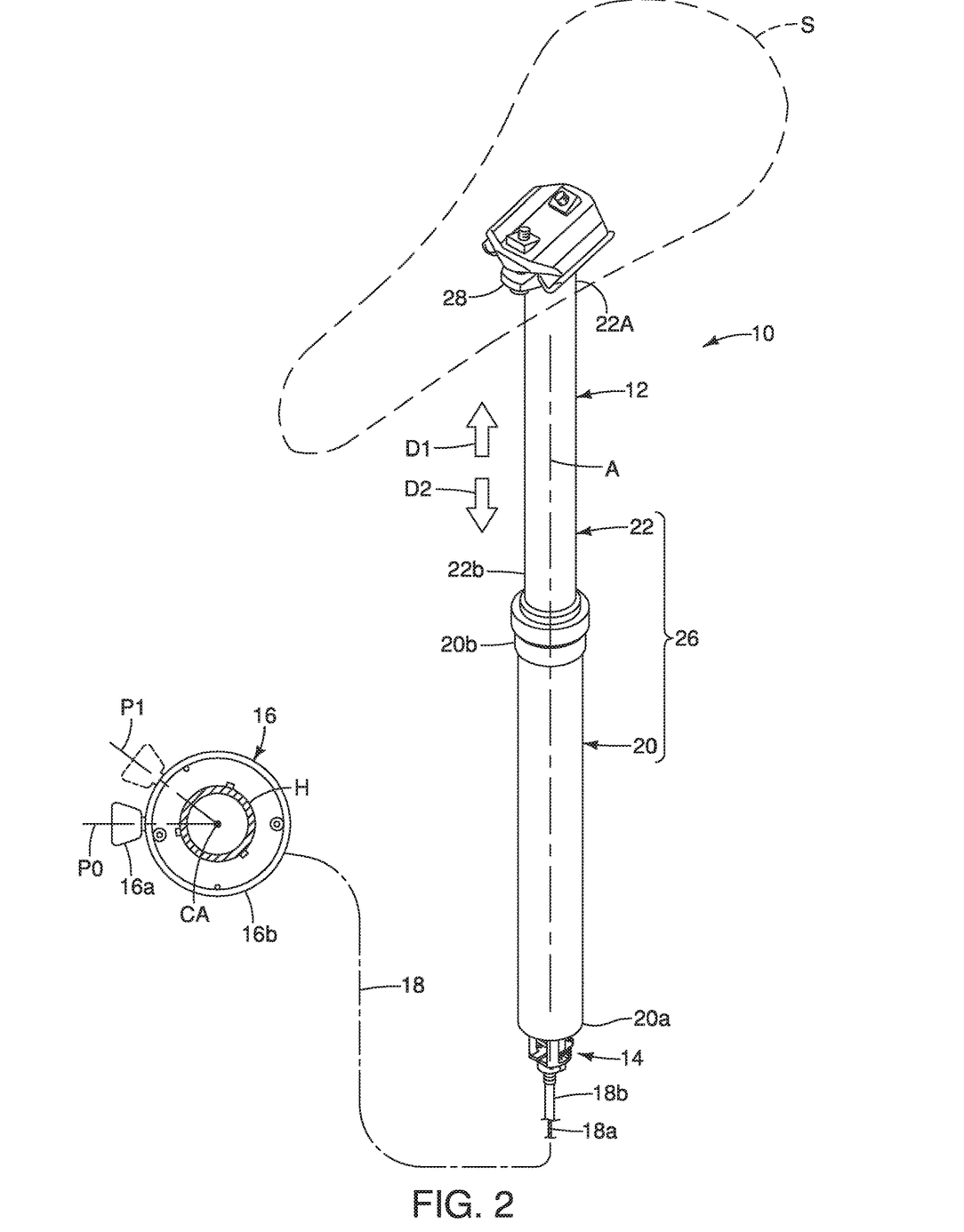
FIG. 2 is a perspective view of the height adjustable seatpost assembly illustrated in FIG. 1.

As seen in FIG. 2, the height adjustable seatpost assembly 10 basically comprises a fluid flow control structure 12 and an actuator 14. As seen in FIG. 2, the height adjustable seatpost assembly 10 further comprises a user operable input device 16 that is operatively coupled to the actuator 14 to operate the fluid flow control structure 12 via the actuator 14. Specifically, the user operable input device 16 is operatively coupled to the actuator 14 via a control cable 18 such as a Bowden cable. The control cable 18 has an inner wire 18a and an outer casing 18b. The inner wire 18a is slidably disposed in the outer casing 18b. The actuator 14 is provided in and/or on the first tube 20 and/or the second tube 22. In other words, while the actuator 14 is mainly disposed outside of the first tube 20, the actuator 14 can be mounted in other positions in and/or on the first tube 20 and/or the second tube 22. In any case, the actuator 14 receives an operation force (e.g., pulling force) applied from the user operable input device 16 via the control cable 18. As a result, the actuator 14 is operated to control the fluid flow control structure 12. However, the actuator 14 is not limited to this embodiment. The actuator 14 can include an electric motor, an electric solenoid, or any other electrical actuator. In a case where the actuator 14 includes an electric motor, the actuator can further include a speed reducer to convert rotation of the motor into linear motion/axial movement of the connecting rod 56. In a case where the actuator 14 includes an electric solenoid, the solenoid is preferably configured to move the connecting rod 56 in the telescopic movement direction.

Figure 3:
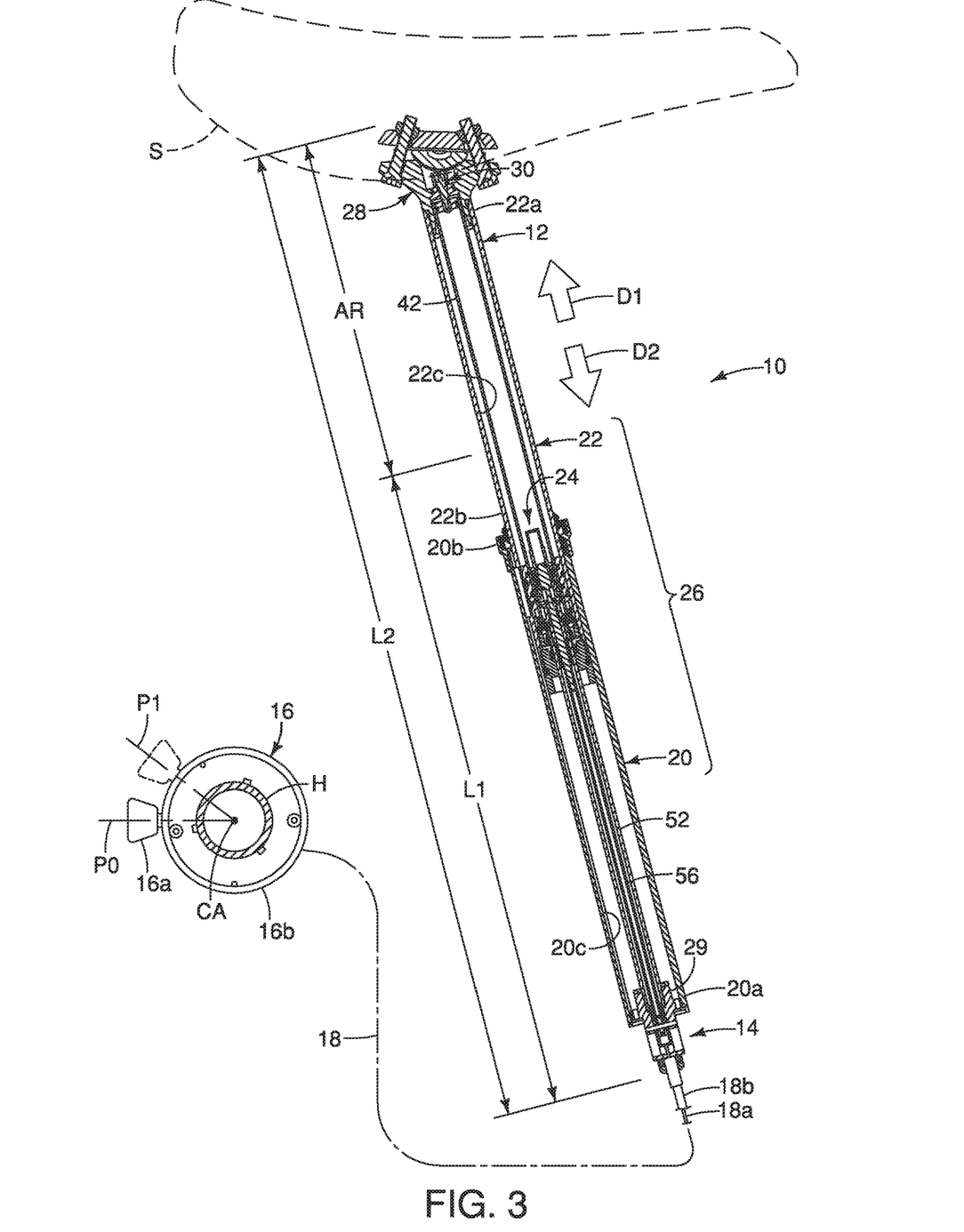
FIG. 3 is a longitudinal cross-sectional view of the height adjustable seatpost assembly illustrated in FIGS. 1 and 2.

As shown in FIGS. 2 and 3, the actuator 14 is configured to actuate the fluid flow control structure 12 in response to operation of the user operable input device 16. The user operable input device 16 is configured to operate the control cable 18. For example, the user operable input device 16 is mounted on the bicycle handlebar H. The user operable input device 16 includes an operated part 16a and a mounting base 16b. The operated part 16a is configured to be pivotal arranged relative to the mounting base 16b from a rest position P0 to an operated position P1 about a pivot axis CA. Each of the rest position P0 and the operated position P1 is defined based on the pivot axis CA of the operated part 16a. The term "rest position" as used herein refers to a state in which the part (e.g., the operated part 16a) remains stationary without the need of a user holding the part in that state corresponding to the rest position. The term "operated position" as used herein refers to a state in which the part (e.g., the operated part 16a) is temporarily held by an external force (e.g., a user holding the part in a state corresponding to the operated position). The control cable 18 is pulled by pivoting the operated part 16a relative to the mounting base 16b from the rest position P0 to the operated position P1. The actuator 14 actuates the fluid flow control structure 12, when the control cable 18 is pulled by pivoting the operated part 16a to the operated position P1.

As seen in FIG. 3, the fluid flow control structure 16 basically comprises a first tube 20, a second tube 22 and a positioning structure 24. The first and second tubes 20 and 22 form a telescoping seatpost 26. The telescoping seatpost 26 adjustable supports the bicycle seat S with respect to the seat tube ST. The positioning structure 24 is operated between a closed state (see FIGS. 4 and 6) and an adjustable state (see FIG. 5) in response to the operation of the user operable input device 16 that is operatively coupled to the actuator 14 by the control cable 18. The positioning structure 24 is in the locked state when the user operable input device 16 is in the rest position P0. Operation of the user operable input device 16 to the operated position P1 pulls the inner wire 18a to move the actuator 14. This movement of the actuator 14 actuates the positioning structure 24, which switches from the locked state (see FIGS. 4 and 6) and the adjustable state (see FIG. 5). Upon release of the user operable input device 16, the operated part 16a pivots from the operated position P1 back to the rest position P0 by a return spring. Thus, the operated part 16a is a trigger type member that return to the rest position when released from the operated position. The actuator 14 is not limited to being mechanically controlled (e.g., via the control cable 18). Alternatively, the actuator 14 can be an electric actuator that is controlled by a control signal that can be transmitted via wireless or wired communication. The actuator 14 also can be disposed as a part of valve rod (e.g., linear actuator).

Here, the first tube 20 is an outer tube and the second tube 22 is an inner tube that is telescopically arranged inside of the first tube 20. In general, the first and second tubes 20 and 22 are telescopically arranged, with an amount of insertion of the second tube 22 into the first tube 20 being adjustable between a plurality of seatpost positions. Thus, the fluid flow control structure 16 is a telescopic apparatus of the human powered vehicle 1. The first tube 20 has a center axis A. The second tube 22 is telescopically coupled to the first tube 20 to move in an axial direction of the center axis A. Basically, the first and second tubes 20 and 22 have a common longitudinal center axis that corresponds to the center axis A of the first tube 20.

As shown in FIG. 3, the second tube 22 is configured to be movable relative to the first tube 20. Specifically, the second tube 22 is configured to be telescopically received in the first tube 20. The second tube 22 moves relative to the first tube 20 in a first telescopic direction D1 to increase an overall length of the telescoping seatpost 26. The second tube 22 moves relative to the first tube 20 in a second telescopic direction D2 to decrease an overall length of the telescoping seatpost 26. The first and second telescopic directions D1 and D2 are parallel to the center axis A. The telescoping seatpost 26 has a minimum overall length L1 and a maximum overall length L2. The overall length of the height adjustable seatpost assembly 10 is adjustable within an adjustable range AR defined as a difference between the maximum overall length L2 and the minimum overall length L1.

As shown in FIG. 1, the first tube 20 is detachably attached to the seat tube ST of the bicycle frame F. For example, the first tube 20 is formed in a substantially cylindrical shape. The first tube 20 has a first or lower end portion 20a, a second or upper end portion 20b and an interior bore 20c. The interior bore 20c extends longitudinally between the first and second end portions 20a and 20b of the first tube 20. The first end portion 20a is opposite to the second end portion 20b. Here, for example, the actuator 14 is provided at the first end portion 20a of the first tube 20. The actuator 14 can be provided at other positions in or outside the height adjustable seatpost assembly 10. For example, the actuator 14 can be mounted to the second tube 22. The second end portion 20b is an open end for receiving the second tube 22 into the interior bore 20c.

As shown in FIG. 3, the second tube 22 is formed in a substantially cylindrical shape. The outer diameter of the second tube 22 is smaller than the inner diameter of the first tube 20. The second tube 22 has a first or upper end portion 22a, a second or lower end portion 22b and an interior bore 22c. The interior bore 22c extends longitudinally between the first and second end portions 22a and 22b of the second tube 22. The first end portion 22a is opposite to the second end portion 22b. The first or upper end portion 22a is provided with a bicycle seat mounting structure 28. The first or upper end portion 22a can also be considered a distal end of the second tube 22 with respect to the first tube 20, while the second end portion 22b can also be considered a proximal end of the second tube 22 with respect to the first tube 20. In this way, the second tube 22 has a distal end disposed closer to a bicycle seat mounting end and a proximal end opposite to the distal end in the axial direction. The actuator 14 is mounted to the first end portion 20a of the first tube 20 by an end plug 29.

The bicycle seat mounting structure 28 is configured to fixedly mount the bicycle seat S to the second tube 22. For example, the bicycle seat S is a saddle. The bicycle seat mounting structure 28 is fixedly attached to the first end portion 22a of the second tube 22. The bicycle seat mounting structure 28 is provided with an air filling valve 30. The positioning structure 24 is primarily provided in the second end portion 22b of the second tube 22.

Figure 4:
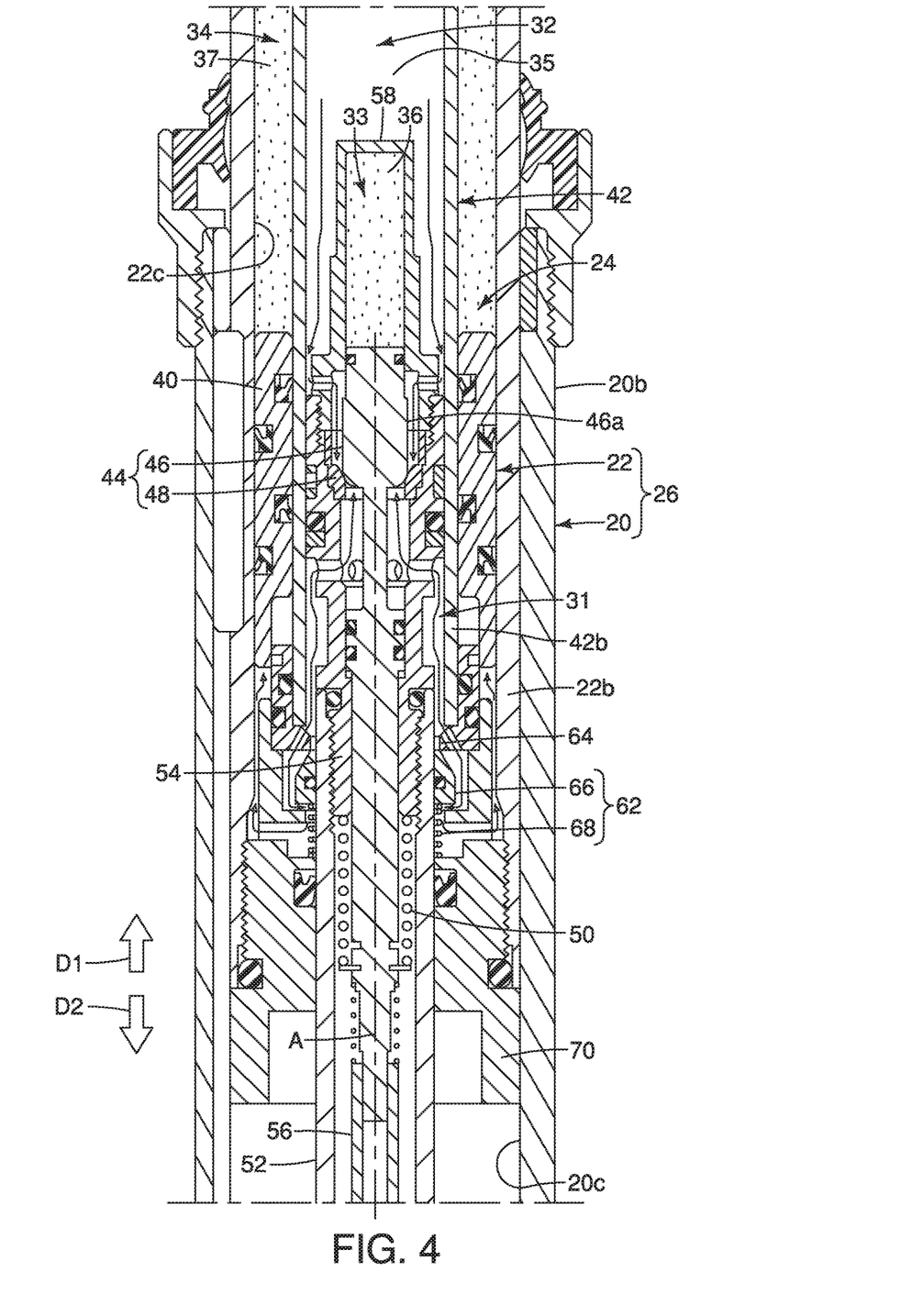
FIG. 4 is a longitudinal cross-sectional view of a middle portion of the height adjustable seatpost assembly illustrated in FIGS. 1 to 3 with the valve in a closed state.
Figure 5:
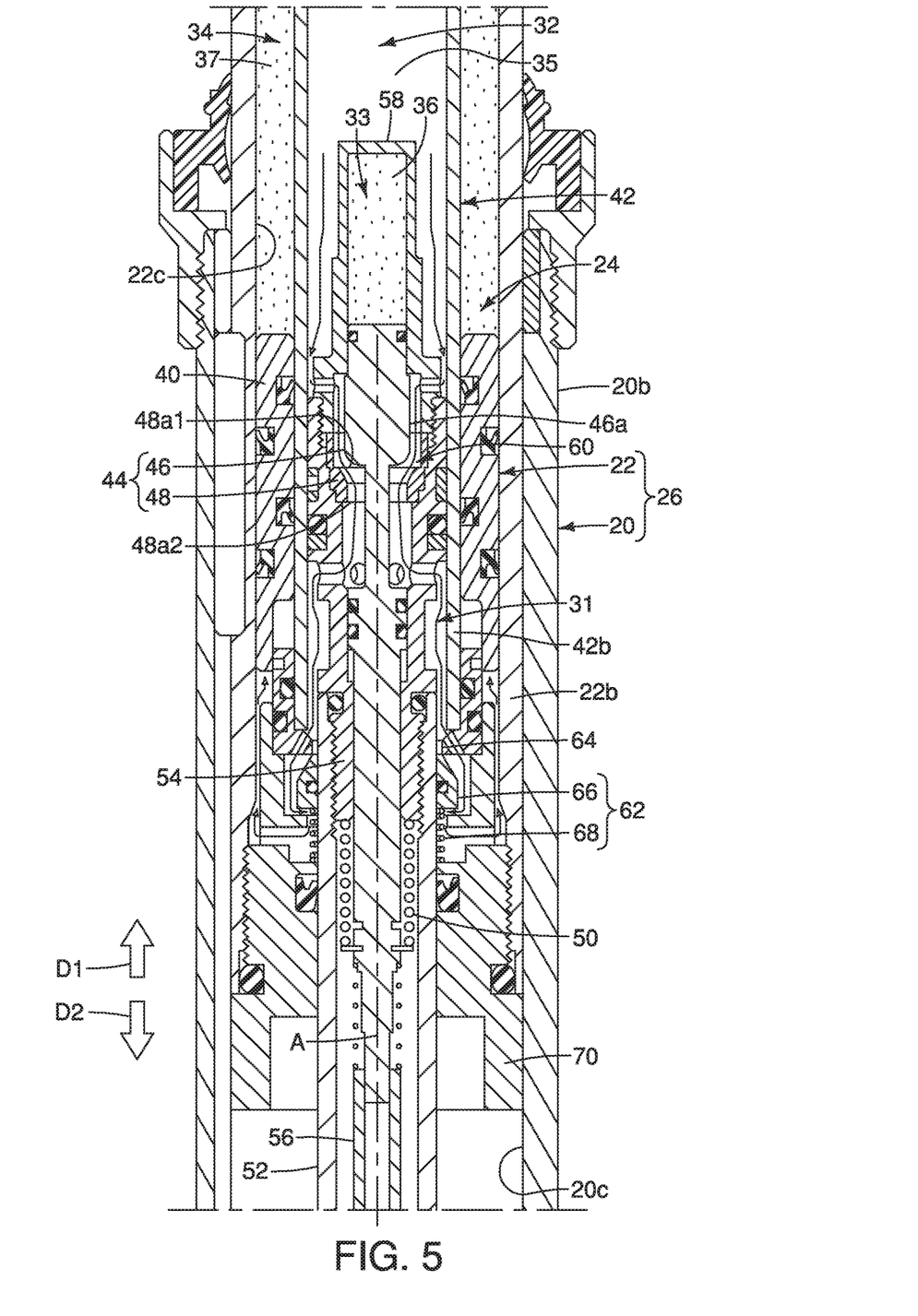
FIG. 5 is a longitudinal cross-sectional view of a middle portion of the height adjustable seatpost assembly illustrated in FIGS. 1 to 3 with the valve in an open state.
Figure 6:
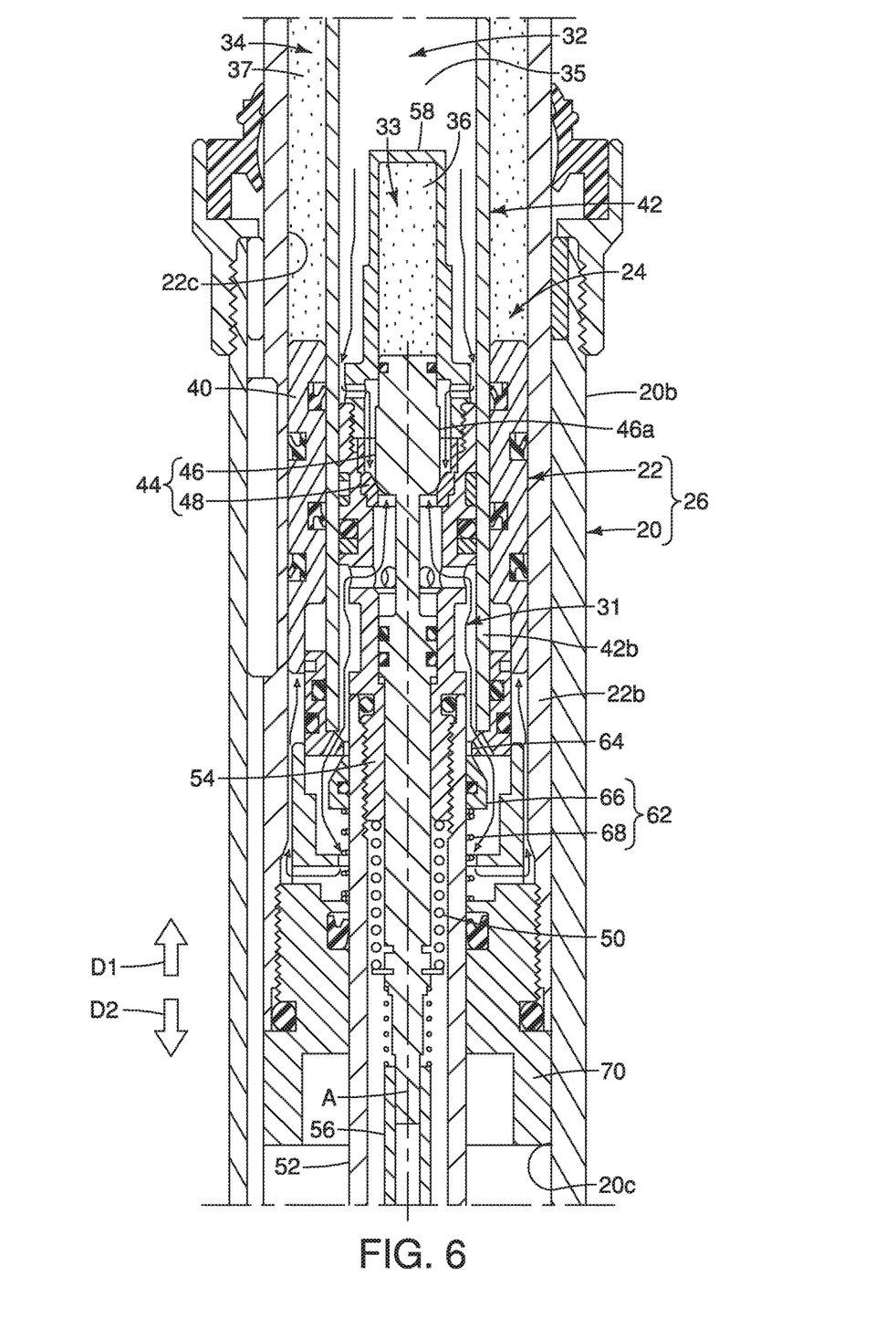
FIG. 6 is a longitudinal cross-sectional view of the middle portion of the height adjustable seatpost assembly illustrated in FIG. 4, but with the first tube being moved downwardly with respect to the second tube while the valve is in the open state.

As shown in FIGS. 4 to 6, the positioning structure 24 is configured to position the first tube 20 and the second tube 22 relative to each other. The positioning structure 24 is configured to be operated via the user operable input device 16 (see FIGS. 2 and 3). As shown in FIGS. 4 to 6, the positioning structure 24 includes the locked state (see FIGS. 4 and 6) and the adjustable state (see FIG. 5). The positioning structure 24 changes a state of the height adjustable seatpost assembly 10 between the locked state and the adjustable state.

In the locked state, as shown in FIGS. 4 and 6, the second tube 22 is fixed relative to the first tube 20 to prevent movement in the axial direction. Specifically, in the locked state, the overall length of the height adjustable seatpost assembly 10 is maintained at an adjusted overall length. In the locked state, the first tube 20 and the second tube 22 are fixedly positioned relative to each other in the telescopic directions D1 and D2. In the adjustable state, as shown in FIG. 5, a position of the second tube 22 is adjustable relative to the first tube 20 in the telescopic directions D1 and D2. Specifically, in the adjustable state, the overall length of the height adjustable seatpost assembly 10 is continuously adjustable within the adjustable range AR by operating the operated part 16a to the operated position P1 (see FIG. 2). Namely, in the adjustable state, the positional relationship between the first tube 20 and the second tube 22 is continuously adjustable within the adjustable range AR. The adjustable state of the height adjustable seatpost assembly 10 is not limited to this embodiment. The total length of the height adjustable seatpost assembly 10 can be stepwise adjusted in the adjustable state. For example, the total length of the height adjustable seatpost assembly 10 can be stepwise adjusted at each of different lengths. Thus, the positioning structure 24 changes the state of the height adjustable seatpost assembly 10 between the locked state and the adjustable state. Specifically, the positioning structure 24 changes the state of the first tube 20 and the second tube 22 between the locked state and the adjustable state.

As shown in FIGS. 4 to 6, the positioning structure 24 includes a first fluid chamber 31, a second fluid chamber 32 and a third fluid chamber 33. Here, in the illustrated embodiment, the positioning structure 24 further includes a fourth fluid chamber 34. The first and second fluid chambers 31 and 32 include an incompressible fluid 35 (shown as a non-shaded area for the sake of illustration). Specifically, the incompressible fluid 35 is filled in each of the first and second fluid chambers 31 and 32. For example, the incompressible fluid 35 can be a hydraulic oil or any other suitable liquid.

As shown in FIGS. 4 to 6, the first chamber 31 is arranged downward from the second chamber 32 and on radially outside of the second chamber 32. In this embodiment, the first chamber 31 is filled with oil as the incompressible fluid 35.

As shown in FIGS. 4 to 6, the second chamber 32 is configured to be disposed closer to the first end portion 22a of the second tube 22 than the first chamber 31 (see FIGS. 4 to 6). The second chamber 32 is arranged outside the third fluid chamber 33, for example, on the upper side of the third fluid chamber 33.

As seen FIGS. 4 to 6, the third fluid chamber 33 is configured to expand as the valve body 46 is moved toward the valve seat 48 in the second telescopic direction D2, and is configured to shrink as the valve body 46 is moved away from the valve seat 48 in the first telescopic direction D1. The third fluid chamber 33 includes a compressible fluid 36 (shown as dots). The third fluid chamber 33 is arranged between the first chamber 31 and the second chamber 32 in the axial direction. In this embodiment, for example, the compressible fluid 36 can be air or any other suitable gas. Thus, the third fluid chamber 33 can be filled with air as the compressible fluid 36.

As shown in FIG. 4, the fourth fluid chamber 34 is arranged on upper side of the first chamber 31. The fourth fluid chamber 34 is arranged on radially outside of the second chamber 32. Here, in the illustrated embodiment, the fourth fluid chamber 34 has a compressible fluid 37 (shown as dots). For example, the compressible fluid 37 can be air or any other suitable gas. In this embodiment, the compressible fluid such as air or gas is filled in the fourth fluid chamber 34.

As shown in FIGS. 4 to 6, the positioning structure 24 further includes a movable piston 40. The movable piston 40 is formed in a substantially cylindrical shape. The movable piston 40 is disposed between the first and fourth fluid chambers 31 and 34 to change a volume ratio between the first and fourth fluid chambers 31 and 34. Specifically, the movable piston 40 is disposed in the space between the inner peripheral surface of the second tube 22 and the outer peripheral surface of the inner tube 42 in the radial direction. The movable piston 40 is configured to be movable between the second tube 22 and the inner tube 42 in the axial direction. In this way, the movable piston 40 is configured to be movable between the first chamber 31 and the fourth fluid chamber 34 in the axial direction. The compressible fluid 37 in the fourth fluid chamber 34 biases the movable piston 40 toward the first fluid chamber 31.

As shown in FIGS. 4 to 6, the positioning structure 24 further comprises an inner tube 42 that is coaxially disposed inside the second tube 22. As seen in FIG. 3, the inner tube 42 has an upper end 42a that is coupled to the bottom of the air filling valve 30. The fourth fluid chamber 34 is defined between the second tube 22 and the inner tube 42 with the air filling valve 30 in fluid communication with the fourth fluid chamber 34 for supplying the compressible fluid 37 therein. The movable piston 40 is slidably supported between the second tube 22 and the inner tube 42.

As shown in FIGS. 4 to 6, the positioning structure 24 further includes a valve 44. Basically, the valve 44 includes a valve body 46 and a valve seat 48. The position of the valve body 46 is continuously adjustable relative to the valve seat 48 between the closed position and the open position. Here, the valve 44 also includes a biasing element 50 for biasing the valve body 46 towards the valve seat 48. Thus, the biasing element 50 is configured to bias the valve body 46 toward the closed position. When the operated part 16a is located at the rest position P0, the valve body 46 is in the closed position by the biasing force of the biasing element 50. When the operated part 16a is operated to the operated position P1, the actuator 14 transmits the operation force applied from the user operable input device 16 to the positioning structure 24. Thereby, the valve body 46 moves relative to the support rod 52 from the closed position to the open position against a biasing force of the biasing element 50. Here, the biasing element 50 is a coil compression spring that is disposed around the valve body 46.

The valve 44 is partial disposed in a lower end 42b of the inner tube 42, and is supported by the first tube 20 via a support rod 52. Thus, the valve body 46 is movable relative to the support rod 52 and the first tube 20 in the axial direction. The support rod 52 is disposed at the lower end 42b of the inner tube 42, and supports the actuator 14. The support rod 52 is a hollow tube that is centered on the center axis A. Thus, the second tube 22 and the inner tube 42 slide with respect to the valve 44 during adjustment of the length (i.e., the height in the case of a seatpost) of the telescoping seatpost 26.

Here, the valve 44 also includes a valve seat support 54 that is attached to the upper end of the support rod 52. The valve seat 48 is coupled to the valve seat support 54, while the valve body 46 is movably disposed inside the support rod 52. The valve body 46 is connected to the actuator 14 by a connecting rod 56. The connecting rod 56 receives the lower end of the valve body 46 such that axial movement of the connecting rod 56 is transmitted to the valve body 46. In this way, the valve body 46 is moved in the axial direction by the operation of the actuator 14. In other words, the actuator 14 is configured to move the valve body 46 to change the valve state from one of the closed state and the open state to the other of the closed state and the open state. In particular, the connecting rod 56 is attached to the valve body 46 for moving the valve body 46 relative to the valve seat 48 in the axial direction in response to movement of the actuator 14 by the user operable input device 16. While the connecting rod 56 is illustrated as being hollow, it will be apparent from this disclosure that the connecting rod 56 does not need to be hollow, and can be modified as needed and/or desired.

In the closed state, the incompressible fluid 35 is immovable between the first chamber 31 and the second chamber 32, and the movable piston 40 is also substantially stable. In the closed state, the bicycle seat S is held at an adjusted height position where a bicycle user sets. In this case, the incompressible fluid 35 doesn't move between the first chamber 31 and the second chamber 32, because the port 60 is closed by the positioning structure 24.

In the open state, the incompressible fluid 35 moves between the first and second chambers 31 and 32 as the second tube 22 moves relative to the first tube 20 in the axial direction. Then, the movable piston 40 moves in the axial direction by the movement of the incompressible fluid 35. For example, the movable piston 40 moves downward as the incompressible fluid 35 moves from the first chamber 31 to the second chamber 32. In this case, the fourth fluid chamber 34 expands, the first chamber 31 shrinks, and the second chamber 32 expands. Thereby, the bicycle seat S moves upward. Also, for example, the movable piston 40 moves upward as the incompressible fluid 35 moves from the second chamber 32 to the first chamber 31. In this case, the fourth fluid chamber 34 shrinks, the first chamber 31 expands, and the second chamber 32 shrinks. Thereby, the bicycle seat S moves downward.

Here, in the illustrated embodiment, the valve body 46 includes a first portion 46a, a second portion 46b and a third portion 46c. While the first portion 46a, the second portion 46b and the third portion 46c are illustrated as a one-piece member, the first portion 46a, the second portion 46b and the third portion 46c could be made of two or more pieces. The first portion 46a contacts the valve seat 48. The second portion 46b extends from the first portion 46a, while the third portion 46c is coupled to the second portion 46b at an opposite end of the second portion 46b from the first portion 46a.

Here, in the illustrated embodiment, the positioning structure 24 further includes a dividing member 58. The dividing member 58 is configured to receive an end portion of the valve body 46. In particular, the dividing member 58 slidably receive the first portion 46a of the valve body 46. In this way, in the illustrated embodiment, the third fluid chamber 33 is defined between the dividing member 58 and the valve 44. The dividing member 58 is attached to the valve seat support 54. Specifically, the dividing member 58 forms the third fluid chamber 33 with the valve body 46. The dividing member 58 is disposed in the inner tube 42. The third fluid chamber 33 is configured such that the compressible fluid 36 biases the valve body 46 toward the valve seat 48 in the open state. The third fluid chamber 33 is configured to increase in volume as the valve body 46 is moved toward the valve seat 48, and is configured to decrease in volume as the valve body 46 is moved away from the valve seat 48. In the illustrated embodiment, the third fluid chamber 33 is configured to be disposed closer to the distal end 22a of the second tube 22 than the first fluid chamber 31.

As best seen in FIG. 5, the valve 44 defines a port 60 that is selectively opened and closed. In particular, the valve body 46 and the valve seat 48 defines the port 60 that is selectively opened and closed by axial movement of the valve body 46 relative to the valve seat 48. The port 60 fluidly connects the first chamber 31 and the second chamber 32 between the valve body 46 and the valve seat 48. The valve body 46 is configured to fluidly separate the first fluid chamber 31 from the second fluid chamber 32 in the closed state and to fluidly connect the first fluid chamber 31 to the second fluid chamber 32 in the open state. In other words, the valve body 46 is movable relative to the valve seat 48 in the axial direction to change a valve state between a closed state and an open state. As shown in FIGS. 4 and 5, the valve body 46 is movable in the first and second telescopic directions D1 and D2 between the open position to open the port 60 and the closed position to close the port 60. In this way, the positioning structure 24 is configured such that the incompressible fluid 35 moves between the first chamber 31 and the second chamber 32.

As shown in FIGS. 4 to 6, in the illustrated embodiment, the first chamber 31 is primarily defined by the second tube 22, the movable piston 40, the inner tube 42, the valve body 46 and the support rod 52. The second chamber 32 is primarily defined by the mounting structure 28, the inner tube 42 and the dividing member 58. The third fluid chamber 33 is primarily defined by the valve body 46 and the dividing member 58. The fourth fluid chamber 34 is primarily defined by the second tube 22, the mounting structure 28, the movable piston 40 and the inner tube 42.

Figure 7:
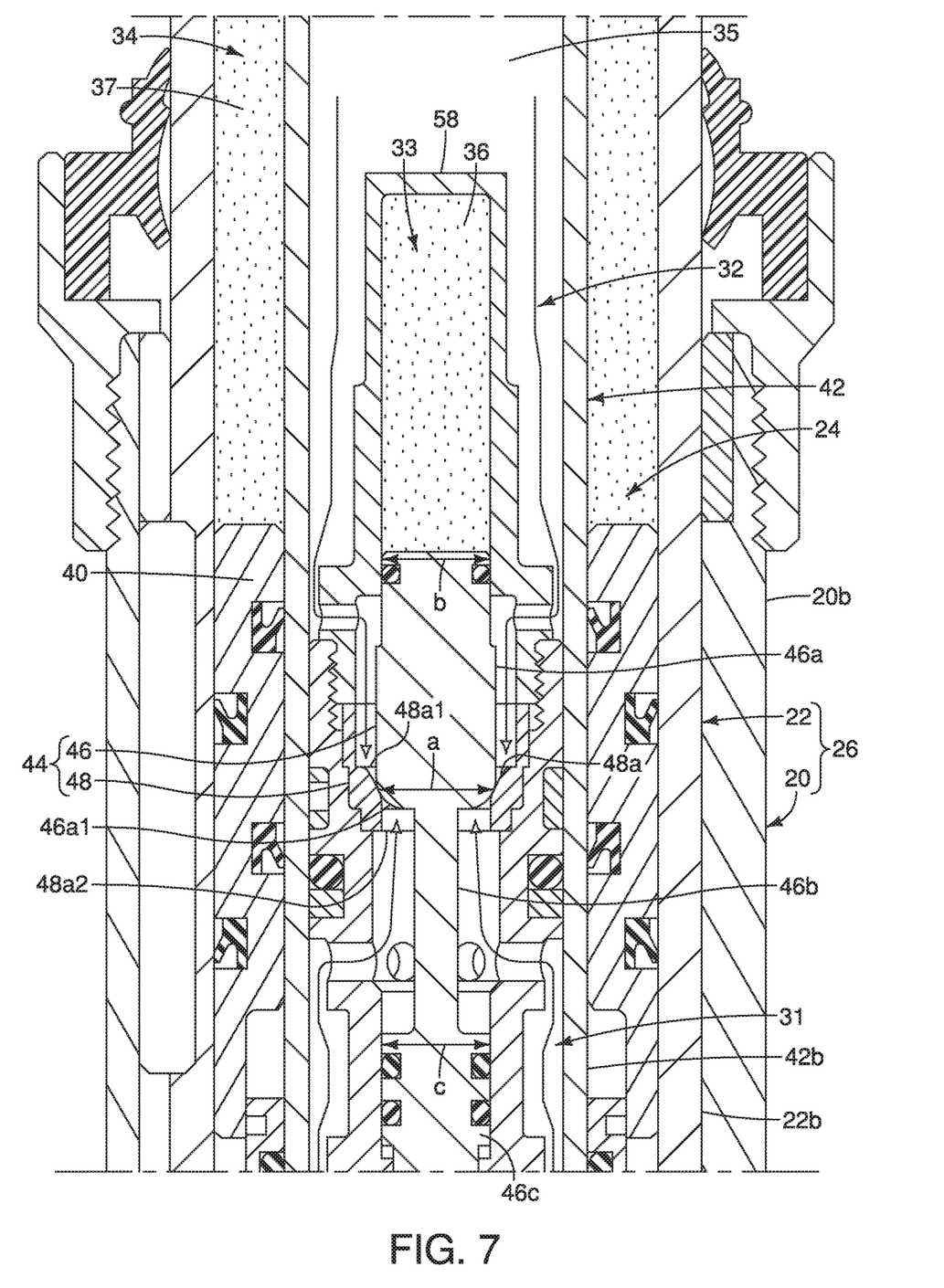
FIG. 7 is an enlarged longitudinal cross-sectional view of the middle portion of the height adjustable seatpost assembly illustrated in FIG. 4.

As seen in FIG. 7, the valve seat 48 is disposed in the valve seat support 54. Specifically, the valve seat 48 is disposed in a concave portion 22c of the valve seat support 54. For example, the valve seat 48 is formed in a substantially annular shape. The valve seat 48 includes a first tapered surface 48a that contacts the valve body 46 in the closed state. The first tapered surface 48a is formed on an inner peripheral portion of the valve seat 48. Preferably, as in the illustrated embodiment, the valve body 46 includes a second tapered surface 46a1 configured to contact the valve seat 48. As shown in FIG. 4, the valve body 46 is arranged in the valve seat 48 so as to contact the first tapered surface 48a of the valve seat 48 when the valve 44 is in the closed state. Thus, the first tapered surface 48a of the valve seat 48 is configured to contact the second tapered surface 46a1 of the valve body 46 while the valve 44 is in the closed state where the port 60 is closed. As shown in FIG. 5, the valve body 46 is arranged in the valve seat 48 so as to be spaced apart from the first tapered surface 48a of the valve seat 48 when the valve 44 is in the open state.

A contact or sealing line is defined where the second tapered surface 46a1 of the valve body 46 contacts the first tapered surface 48a of the valve seat 48. For example, the contact line is formed in a substantially annular shape. The contact or sealing line can be zonal area with a prescribed axial width.

Also, preferably, as in the illustrated embodiment, at least part of the second tapered surface 46a1 includes a partial spherical surface. The first tapered surface 48a has a first axial end 48a1 and a second axial end 48a2. The first tapered surface 48a is configured such that a diameter of the first tapered surface 48a decreases from the first axial end 48a1 toward the second axial end 48a2. The first axial end 48a1 is disposed closer to the third fluid chamber 33 than is the second axial end 48a2.

As seen in FIG. 7, the first fluid chamber 31 and the valve body 46 defines a first pressure-receiving dimension "a" while the valve 40 is in the closed state. More specifically, the first fluid chamber 31 and the first portion 46a of the valve body 46 defines the first pressure-receiving dimension "a" while the valve body 46 is in the closed state. The first pressure-receiving dimension "a" is defined along an outer diameter of the first portion 46a of the valve body 46 that is located in the third fluid chamber 33. The first pressure-receiving dimension "a" is also defined by an inner diameter of the dividing member 58. The third fluid chamber 33 and the valve body 46 defines a second pressure-receiving dimension "b" while the valve 40 is in the closed state. More specifically, the third fluid chamber 33 and the first portion 46a of the valve body 46 defines the second pressure-receiving dimension "b" while the valve body 46 is in the closed state. The pressure-receiving dimension "b" is defined along the contact or sealing line that is defined where the second tapered surface 46a1 of the valve body 46 contacts the first tapered surface 48a of the valve seat 48. The second pressure-receiving dimension "b" is smaller than the first pressure-receiving dimension "a". Since the second pressure-receiving dimension "b" is smaller than the first pressure-receiving dimension "a", the downward load pressure acting on the first portion 46a of the valve body 46 from the incompressible fluid 35 in the second chamber 32 is equal to the pressure receiving area defined by the second pressure-receiving dimension "b" minus the pressure receiving area defined by the second pressure-receiving the first pressure-receiving dimension "a". As a result, the sealing performance of the valve 44 can be improved while still providing a light operating force to open the valve 44 using the operated part 16a.

The first fluid chamber 31 and the third portion 46c of the valve body 46 defines a third pressure-receiving dimension "c" while the valve body 46 is in the closed state. The second and third pressure-receiving dimensions "b" and "c" are equal. In the illustrated embodiment, these pressure-receiving dimensions "a", b" and "c" refer to surface areas of the valve body 46 that receive a pressure in the axial direction. With this arrangement, adjustment of the length (i.e., the height in the case of a seatpost) of the telescoping seatpost 26 can be improved by providing a light operating force to open the valve 44 using the operated part 16a at all times while suppressing a change in the operating force derived from the seating load.

Figure 8:
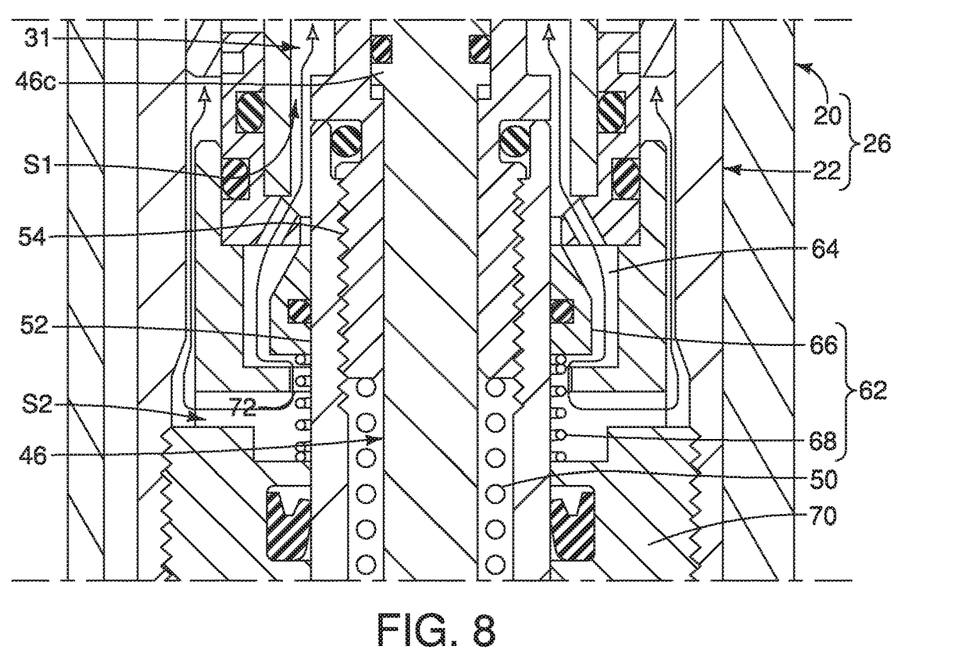
FIG. 8 is an enlarged longitudinal cross-sectional view of the middle portion of the height adjustable seatpost assembly illustrated in FIG. 5, but with a check valve opened.
Figure 9:
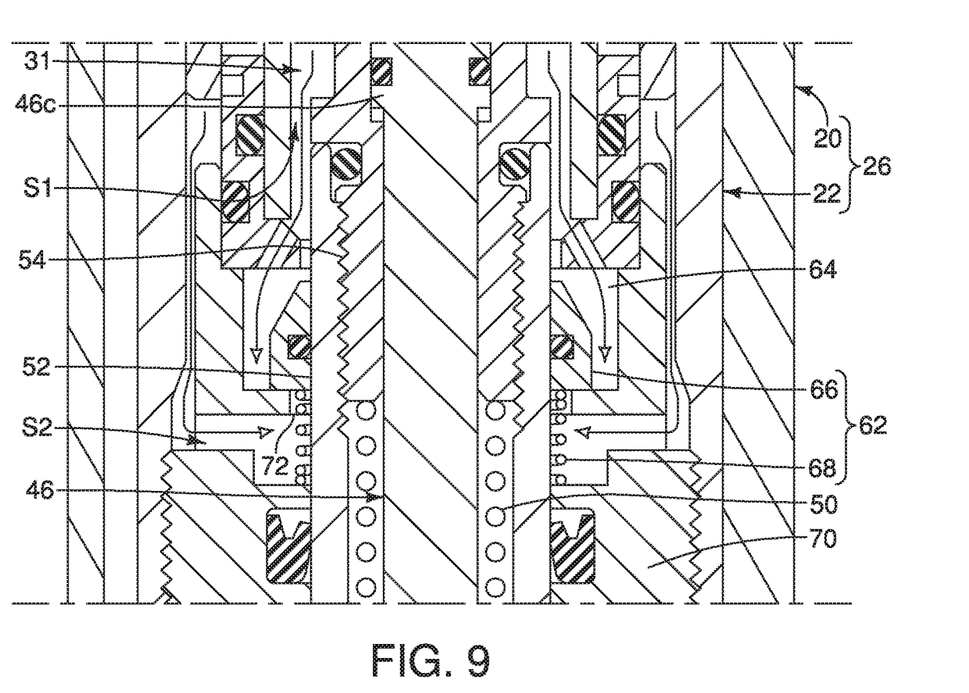
FIG. 9 is an enlarged longitudinal cross-sectional view, similar to FIG. 8, of the middle portion of the height adjustable seatpost assembly illustrated in FIG. 5, but with the check valve closed.

As best seen in FIGS. 8 and 9, the positioning structure 24 further includes a check valve 62 that is disposed in a fluid passage 64 of the first fluid chamber 31. The check valve 62 divides the first fluid chamber 31 into a first space S1 and a second space S2. The check valve 62 is normally biased towards an open position as seen in FIG. 8 so that the incompressible fluid 35 can freely flow between the first and second spaces S1 and S2. When the valve 44 of the positioning structure 24 is in a closed position, as seen in FIG. 9, the incompressible fluid 35 is prevented from flow between the first and second spaces S1 and S2.

When the valve 44 of the positioning structure 24 is switched from the closed state to the open state, the incompressible fluid 35 flows from the second fluid chamber 32 to the first fluid chamber 31 via the port 60. Since the incompressible fluid 35 in the second fluid chamber 32 has a higher fluid pressure than the incompressible fluid 35, a volume change occurs during the switching operation of the valve 44 of the positioning structure 24. The third fluid chamber 33 with the compressible fluid 36 compensates for this volume change that occurs during the switching operation of the valve 44 of the positioning structure 24. With this arrangement, the volume change does not affect the check valve 62, so that the check valve 62 do not becoming stuck during the switching operation of the valve 44 of the positioning structure 24.

In the illustrated embodiment, the check valve 62 includes a valve body 66 and a biasing member 68. An end plug 70 is fixed to the second end portion 22b of the second tube 22, and supports the check valve 62 on the second tube 22 so that the check valve 62 moves with the second tube 22 as the second tube 22 moves axially relative to the first tube 20. The valve body 66 is a substantially annular member that is slidable disposed around the support rod 52 for movement in the axial direction. The biasing element 68 is a coil compression spring that is disposed around the support rod 52. The end plug 70 acts as an abutment for the biasing element 68, and also aids in supporting the support rod 52. The biasing element 68 applies a biasing force on the valve body 66 to urge the valve body 66 towards the open position as seen in FIG. 8.

With the valve 44 is in the open state, the bicycle seat S and the second tube 22 moves upward with respect to the first tube 20 due to the force of the compressible fluid 37 applying a force on the movable piston 40 in a downward direction which causes the incompressible fluid 35 to flow from the first fluid chamber 31 to the second fluid chamber 32 via the fluid passage 64 and the port 60. More specifically, with the check valve 62 in the open position, the incompressible fluid 35 is forced upward through the fluid passage 64 by the downward movement of the movable piston 40. Then, with the valve 44 is in the open state, the incompressible fluid 35 is forced upward through the port 60 from the first fluid chamber 31 to the second fluid chamber 32 to force the bicycle seat S and the second tube 22 moves upward with respect to the first tube 20. When the incompressible fluid 35 is forced upward through the port 60, the valve body 66 is pressed upward by flow of the incompressible fluid 35 and the compressible fluid 36 in the third chamber 33 is compressed.

However, in case that the bicycle seat S is pushed down with the valve 44 is in the open state, the valve body 66 moves upward with respect to the sealing plug 36 by the sliding resistance between the valve body 66 and the second support member 22b. In this case, the incompressible fluid 35 moves from the second fluid chamber 32 to the first fluid chamber 31 via the port 60. Also, the incompressible fluid 35 passes through the fluid passage 64 towards the movable piston 40, since the check valve 62 is held in the open position by the biasing element 68.

In case that the bicycle seat S is pulled up with the valve 44 is in the closed state, the valve body 66 moves downward with respect to the end plug 70 is fixed to the second end portion 22b of the second tube 22 against the force of the biasing element 68 as seen in FIG. 9. Specifically, the pressure of the incompressible fluid 35 increases in space between the port 60 and the valve body 66 to move the valve body 66 downward overpowering the force of the biasing element 68. Thus, the valve body 66 is pressed downward by the incompressible fluid 35 abut against the end plug 70 to close an annular gap 72 between the end plug 70 and the support rod 52. In this way, the valve body 66 prevents the incompressible fluid 35 in the first fluid chamber 31 from flowing from the second space S2 towards toward the first space S1. Thereby, the incompressible fluid 35 in the first fluid chamber 31 is substantially stable by the check valve 62, even if the bicycle seat S is manually pulled up while the valve 44 is in the closed state.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the fluid flow control structure. In other words, directions terms are determined based a rider who sits on a bicycle seat of a bicycle with facing a bicycle handlebar. Similarly, the terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fluid flow control structure for a telescopic apparatus of a human powered vehicle, the fluid flow control structure comprising:
   a first tube having a center axis;
   a second tube telescopically coupled to the first tube to move in an axial direction of the center axis; and
   a positioning structure including a first fluid chamber, a second fluid chamber, a third fluid chamber, and a valve defining a port that is selectively opened and closed, the valve including a valve body and a valve seat, the valve body being movable relative to the valve seat in the axial direction to change a valve state between a closed state and an open state, the valve body being configured to fluidly separate the first fluid chamber from the second fluid chamber in the closed state and to fluidly connect the first fluid chamber to the second fluid chamber in the open state, the third fluid chamber including a compressible fluid,
   the third fluid chamber being configured such that the compressible fluid biases the valve body toward the valve seat in the open state.

2. A fluid flow control structure for a telescopic apparatus of a human powered vehicle, the fluid flow control structure comprising:
   a first tube having a center axis;
   a second tube telescopically coupled to the first tube to move in an axial direction of the center axis; and
   a positioning structure including a first fluid chamber, a second fluid chamber, a third fluid chamber, and a valve defining a port that is selectively opened and closed, the valve including a valve body and a valve seat, the valve body being movable relative to the valve seat in the axial direction to change a valve state between a closed state and an open state, the valve body being configured to fluidly separate the first fluid chamber from the second fluid chamber in the closed state and to fluidly connect the first fluid chamber to the second fluid chamber in the open state, the third fluid chamber including a compressible fluid,
   the first fluid chamber and the valve body defining a first pressure-receiving dimension while the valve is in the closed state, and
   the third fluid chamber and the valve body defining a second pressure-receiving dimension while the valve is in the closed state, the second pressure-receiving dimension being smaller than the first pressure-receiving dimension.

3. The fluid flow control structure according to claim 1, wherein
   the first and second fluid chambers include an incompressible fluid.

4. The fluid flow control structure according to claim 1, wherein
   the third fluid chamber is configured to increase in volume as the valve body is moved toward the valve seat, and is configured to decrease in volume as the valve body is moved away from the valve seat.

5. The fluid flow control structure according to claim 1, wherein
   the third fluid chamber is defined between a dividing member and the valve.

6. The fluid flow control structure according to claim 5, wherein
   the dividing member is configured to receive an end portion of the valve body.

7. The fluid flow control structure according to claim 1, wherein
   the second tube has a distal end disposed closer to a bicycle seat mounting end and a proximal end opposite to the distal end in the axial direction, and
   the third fluid chamber is configured to be disposed closer to the distal end of the second tube than the first fluid chamber.

8. The fluid flow control structure according to claim 1, wherein
   the valve seat includes a first tapered surface that contacts the valve body in the closed state.

9. The fluid flow control structure according to claim 8, wherein
   the first tapered surface has a first axial end and a second axial end, the first tapered surface is configured such that a diameter of the first tapered surface decreases from the first axial end toward the second axial end, the first axial end is disposed closer to the third fluid chamber than is the second axial end.

10. The fluid flow control structure according to claim 9, wherein
    the valve body includes a second tapered surface configured to contact the valve seat.

11. The fluid flow control structure according to claim 10, wherein
    at least part of the second tapered surface includes a partial spherical surface.

12. The fluid flow control structure according to claim 1, wherein
    the positioning structure further includes a fourth fluid chamber having a compressible fluid, and a movable piston disposed between the first and fourth fluid chambers to change a volume ratio between the first and fourth fluid chambers, the compressible fluid in the fourth fluid chamber biasing the movable piston toward the first fluid chamber.

13. The fluid flow control structure according to claim 12, wherein
    the positioning structure further includes a check valve disposed in a fluid passage of the first fluid chamber to block incompressible fluid in the first fluid chamber from flowing away from the valve body towards the movable piston while the valve body is in the closed state.

14. The fluid flow control structure according to claim 1, wherein
    the valve body includes a first portion that contacts the valve seat, a second portion that extends from the first portion, and a third portion coupled to the second portion at an opposite end of the second portion from the first portion,
    the first fluid chamber and the first portion of the valve body defines a first pressure-receiving dimension while the valve body is in the closed state,
    the third fluid chamber and the first portion of the valve body defines a second pressure-receiving dimension while the valve body is in the closed state, the second pressure-receiving dimension being smaller than the first pressure-receiving dimension, and
    the first fluid chamber and the third portion of the valve body defines a third pressure-receiving dimension while the valve body is in the closed state, the second and third pressure-receiving dimensions being equal.

15. The fluid flow control structure according to claim 1, further comprising
an actuator configured to move the valve body to change the valve state from one of the closed state and the open state to the other of the closed state and the open state.

16. A height adjustable seatpost assembly as the telescopic apparatus comprising the fluid flow control structure according to claim 1, further comprising:
an actuator configured to move the valve body to change the valve state from one of the closed state and the open state to the other of the closed state and the open state.

* * * * *